Figure 1:
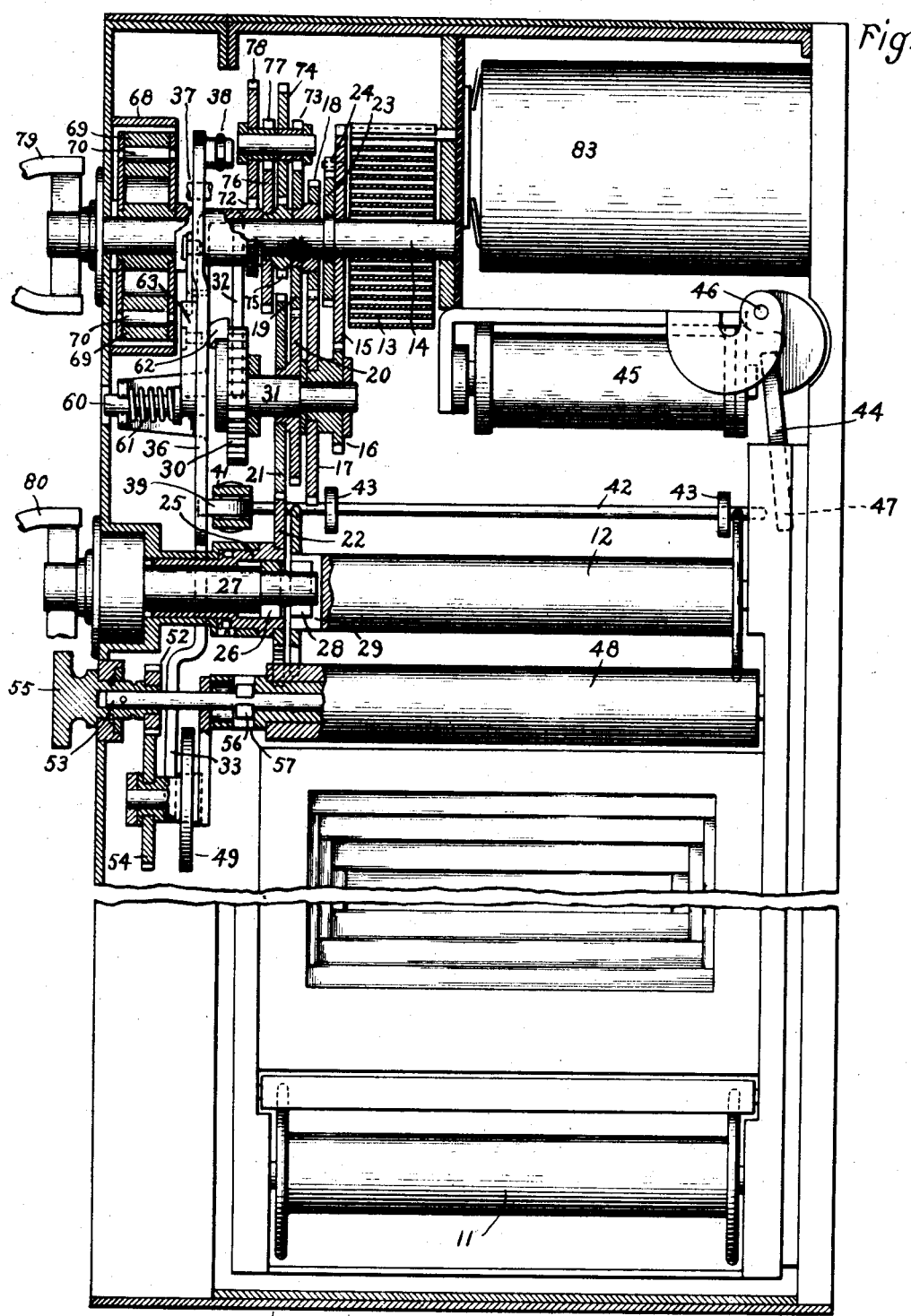

Mar. 13, 1923.

H. F. DOBBIN.
PHOTOGRAPHIC CAMERA.
FILED AUG. 31, 1918.

1,448,526.

2 SHEETS—SHEET 1.

Inventor.
Henry F. Dobbin
by
Atty.

Mar. 13, 1923.  
H. F. DOBBIN.  
PHOTOGRAPHIC CAMERA.  
FILED AUG. 31, 1918.
1,448,526.
2 SHEETS—SHEET 2.
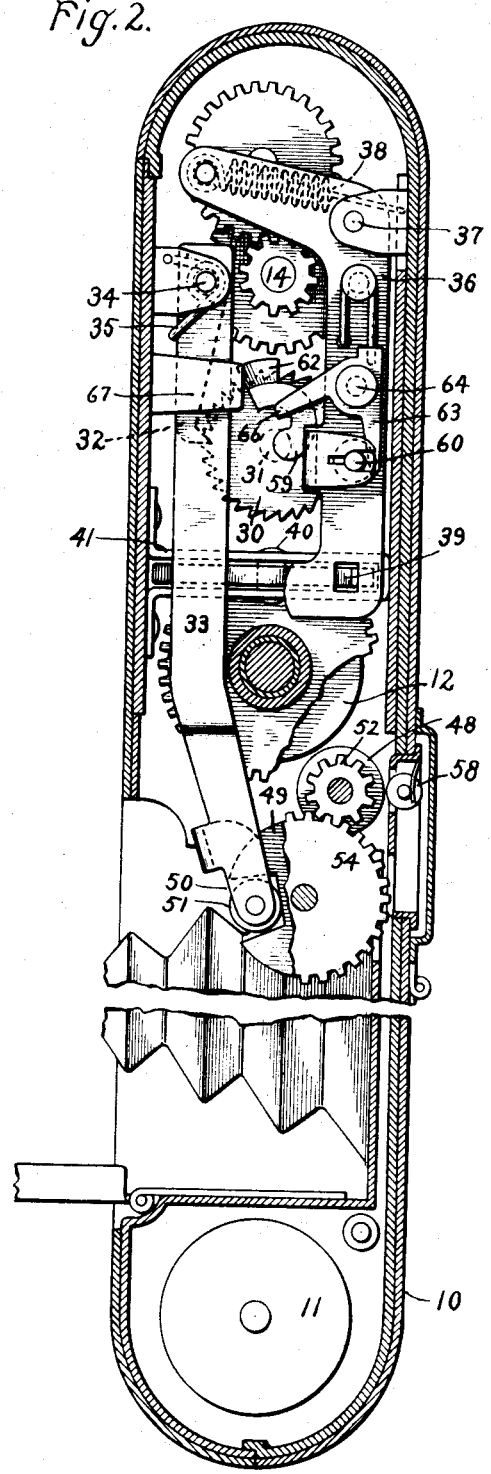
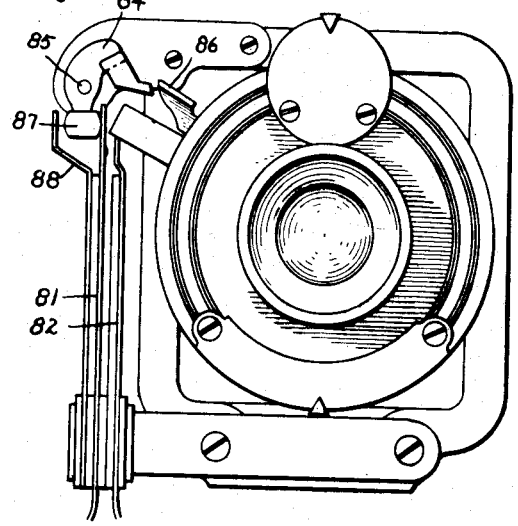
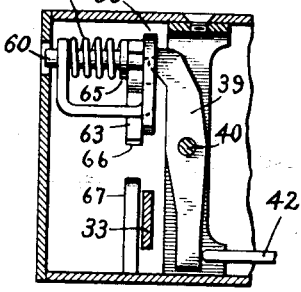 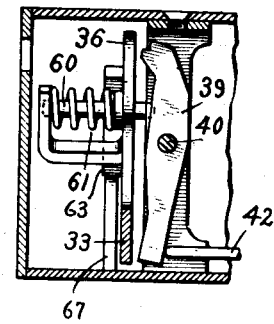
Inventor.  
Henry F. Dobbin,  
by Frank Siebolt  
Atty.

Patented Mar. 13, 1923.

1,448,526

UNITED STATES PATENT OFFICE.

HENRY F. DOBBIN, OF NEW YORK, N. Y.

PHOTOGRAPHIC CAMERA.

Application filed August 31, 1918. Serial No. 252,138.

*To all whom it may concern:*

Be it known that I, HENRY F. DOBBIN, a citizen of the United States, residing in the city, county, and State of New York, have invented certain new and useful Improvements in Photographic Cameras, of which the following is a specification.

My invention relates to photographic cameras and has for its object the provision of means whereby the sensitized surface is automatically shifted after each exposure.

My invention relates more specifically to photographic cameras of the type employing a sensitized film and has for one of its objects the provision of means whereby after each exposure the film is shifted into place for the next exposure. In one embodiment of my invention I employ a primary source of power such as an electric battery for causing the film to be shifted. While my invention may be applied to photographic cameras generally without regard to size or construction its greatest utility is found in the folding or pocket camera. Obviously the space available for battery or electromagnetic mechanism is exceedingly limited in such a camera and I, therefore, provide means whereby a very small battery or dry cell will serve the purpose. To this end I provide that the only work to be done by the battery shall be the initiating or setting in operation another source of power which is preferably a spring. The arrangement is such that upon the closing movement of the shutter, the battery energizes an electromagnet which releases a spring driven mechanism. This mechanism shifts the film the proper amount to position it for the next exposure and is then automatically stopped. While the instantaneous energization of an electromagnet during the closing of the shutter starts the spring driven mechanism which operates the film roll, the mechanism is stopped independently of the shutter when the film has been rolled a definite amount. The spring which, as illustrated, is manually wound when a roll or film is inserted in the camera, provides power for shifting as many times as there are sections on the film. Other objects and purposes of my invention will appear in the course of the following specification in which I have shown my invention embodied in concrete form for purposes of illustration.

In the accompanying drawings illustrating my invention, Fig. 1 is a rear view partly in section of a camera embodying my invention; Fig. 2 is a section at right angles to that shown in Fig. 1; Fig. 3 shows the shutter and contact mechanism, and Figs. 4 and 5 show details of construction.

Referring to the drawings, 10 represents the casing of the camera which is of the ordinary construction although somewhat enlarged to receive my improvements; 11 represents the delivery spool and 12 the receiving spool for a film which it will be understood is placed on spool 11, stretched across to spool 12 where it is taken up in the usual way. 13 is a spring which may be an ordinary clock spring having the outer end secured to the frame while the inner end is secured to the shaft 14. This spring drives the spool 12 through gears 15, 16, 17, 18, 19, 20, 21 and 22. This train of gears is driven by a ratchet wheel 23 secured to the shaft 14 which drives a pawl 24 secured to the gear 15. The last gear 22 of the train drives the spool 12 through a slip connection, the gear 22 being secured to a hollow shaft 25 and a wedging member 26 driving a shaft 27 in one direction and slipping in the opposite direction in a well understood manner. This shaft 27 drives the spool 12 by means of a flat strip 28 which enters a transverse slot 29 in the spool. The spring will, therefore, drive the spool through the train of gears when the spring is wound up and the movement is not restrained. The means for restraining or locking the train of gears consists of a ratchet wheel 30 secured to a shaft 31 which rotates with the gear train and a pawl 32 for engaging the ratchet.

Referring once more to the train of gears between the spring and the spool, it will be noted that gears 18 and 19 are secured together on a sleeve which is free to rotate on the shaft 14. Gears 16 and 17 are likewise secured together and free to rotate on a shaft 31. Gears 20 and 21 are secured together but are also secured to the shaft 31 so that if the shaft 31 is locked against rotation, the movement of the gear train is stopped. The pawl 32 which locks and releases the gear train is at one end of a bar 33 which is pivoted at 34 and is U-shaped at the pivotal point. This arm is pressed inward by a spring 35 so that the pawl 32 normally engages the ratchet 30. In other words, the bar 33 always comes to locking position when permitted to do so.

For moving the bar 33 to release the gear train I provide an arm 36 pivoted at 37 which is arranged to give the bar 33 a hammer blow at the proper time and move the pawl 32 out of engagement with the ratchet 30. This arm 36 is spring pressed toward the bar 33 by a relatively strong spring 38. The arm 36 is held against the tension of the spring in position to deliver the hammer blow to the bar 33 by a latch 39 pivoted at 40 in a stationary frame 41. When the arm 36 is forced back to the position shown in Fig. 2, so that the spring 38 is under tension, the latch 39 holds it in this position and, when the latch is tripped, the arm 36 is swung over quickly by spring 38 and gives the bar 33 a sharp blow which moves the pawl 32 out of engagement with the ratchet 30 and permits the gear train to operate.

The latch is tripped by a rod 42 which moves longitudinally in guides 43. One end of this rod engages the end of the latch 39 (see Figs. 4 and 5), while the opposite end is engaged by an armature 44 of an electromagnet 45. This armature is pivoted to the frame of the electromagnet at 46 and has a projection 47 which engages the rod 42 when the magnet 45 is energized. The energization of the magnet, therefore, trips the latch 39 and releases the gear train.

In order to limit the movement of the gear train and hence the movement of the film to a definite amount, I provide what I shall call a measuring roll 48. The surface of this roll is of some material having a high coefficient of friction, such as cork, so that the film by engaging this roll as it passes from spool 11 to spool 12, will turn the measuring roll 48 without slip. This roll as it is turned by the film drives a disk 49 provided with a slot 50 which receives a roller 51 on the end of the bar 33. When the disk 49 is in the proper position (as shown in Fig. 2) the roller 51 may enter the slot 50, and when in this position the pawl 32 will be in locking position. On the other hand, when the roller is moved out of the slot, and the disk rotates, the pawl 31 will be held out of locking position as the roller 51 rolls around the disk 49. In other words, when the roller is moved out of the slot to release the gear train, it will remain out until the disk makes one revolution to permit the roller to again enter the slot. It is this one revolution of the disk which measures the length of film reeled up on the spool 12 between successive stoppages of the gear train. The disk 49 is driven from the measuring roll 48 through a gear 52 secured to the shaft 53 meshing with a gear 54, secured to the disk 49. The shaft 53 is movable into and out of driving relation with the roll 48 by a knurled nut 55 secured to the shaft by which the shaft may be pulled longitudinally and move a strip 56 on the shaft out of the slot 57 in the roller. When the shaft is thus moved longitudinally the gear 52 is moved out of mesh with gear 54. The film is pressed into engagement with the measuring roll by a spring-pressed roll 58.

The particular arrangement whereby the hammer arm 36 is returned against the tension of its spring after it releases the pawl 32, I have shown as comprising a cam 59 secured to the ratchet 30. There is a pin 60 which is spring pressed through the arm 36 by a spring 61 so that its end engages the ratchet 30. When the pin is thus projected through into engagement with the ratchet, the turning of the ratchet causes the cam surface to engage the pin and force the arm 36 to the right on its pivot over to the position shown in Fig. 2. In order to withdraw this pin so that the arm 36 may again move forward without interference by the cam, I provide an arrangement for moving the pin back as the ratchet 30 rotates. This consists of an inclined surface 62 on the ratchet wheel which the pin engages at the end of the cam 59. This inclined surface forces the pin 60 back against the tension of the spring 61 and when it is moved back far enough, a latch 63, pivoted at 64 holds it there. As shown in Figs. 4 and 5 the end of this latch passes between the shoulder 65 on the pin and the arm 36, so that the latch holds the pin in the position shown in Fig. 4 against the tension of the spring. The arm 36 may, therefore, move forward to deliver a hammer blow, and, as it does so, one end 66 of the latch engages a stationary projection 67 and moves the latch out of locking position (see Fig. 5) so that the pin projects through the arm for engagement with the cam 59.

For energizing the electromagnet which starts the gear train in operation and shifts the film, I provide the arrangement shown in Fig. 3. Two contact springs 81 and 82 form the terminals which complete the circuit of the battery 83 through the electromagnet 45. These contacts are in engagement for an instant during the closing movement of the shutter, but are not in engagement during the opening movement. To this end I provide an arm 84 pivoted at 85 which is engaged by the lever 86 as the latter moves down to open the shutter. This arm 84 has a projection 87 which engages a spring strip 88 and deflects it as the lever 86 is moved down to open the shutter. This has no effect upon the contacts 81 and 82. When, however, the lever 86 is released, the spring 88 throws the projection 87 over so as to engage the contact 81 and force it over into engagement with the contact 82. This engagement is maintained only for an instant which, however, is sufficient for the magnet 45 to move its armature 44 and release the gear train.

In order to retard and steady the movement as the spring drives the spool 12 through the gear train, I provide a governor which I have shown as a centrifugal governor. It consists of a stationary circular casing 68 through the center of which the shaft 14 passes. Within this casing are the governor weights 69 pivoted on pins 70 secured to a sleeve 71 rotatable on shaft 14. This sleeve has secured to it a gear 72 which is driven from gear 19 of the main gear train through gears 73, 74, 75, 76, 77 and 78. This gearing causes the governor weights to revolve rapidly and press against the casing 68 by centrifugal force and act as a friction governor. The spring 13 is wound by the thumb nut 79. It will also be understood that the film may be rolled by hand through the thumb nut 80 secured to the shaft 27, this being possible because of the slip connection between the shaft and the gear train.

In the operation of my device the roll of film is placed upon the spool 11 and the end of the film stretched across the measuring roll 48 to the spool 12 where it is taken up manually by turning the thumb nut 80, until the film is in proper position for the first exposure. When the shutter is operated (either time or instantaneous) the opening movement of the shutter deflects the spring 88 but nothing else happens. When the shutter is closed, however, by releasing the lever 86 the contact springs 81 and 82 engage to complete the circuit of the battery 83 through the electromagnet 45 which attracts its armature 44 and trips the latch 39 by shifting the rod 42 longitudinally. The spring thereupon operates to shift the reel 12 by the proper amount which is determined by measuring roll 48. While the film is being shifted in this way the parts are restored to operative position for the next operation in the manner above described.

It will be seen that I have provided an arrangement whereby, upon each exposure, the film is automatically shifted for the next exposure. Dry cell 83 will last a long time since very little energy is expended in shifting the film. This dry cell may be renewed at a very small expense.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. The combination in shutter and film roll mechanism for cameras and the like, of a battery associated therewith, an electromagnet, and means whereby upon the operation of the shutter the magnet is energized by the battery to effect a shifting of the film for a subsequent exposure.

2. The combination in shutter and film roll mechanism for cameras and the like, of a battery associated therewith, and electromagnetic means energized during the closing movement of the shutter for effecting the shifting of the film for a subsequent exposure.

3. The combination in shutter and film roll mechanism for cameras and the like, of a manually wound spring for storing power to shift the film, a primary source of power and means whereby upon the operation of the shutter power is supplied to cause the spring to shift the film for a subsequent exposure.

4. The combination in shutter and film roll mechanism for cameras and the like, of a primary source of power, a measuring roll over which the film passes and means whereby upon each operation of the shutter the film is shifted a definite amount determined by the movement of the measuring roll.

5. The combination in shutter and film roll mechanism for cameras and the like, of a manually wound spring for storing power to shift the film, a battery, electromagnetic means whereby upon the operation of the shutter power is supplied to cause the spring to shift the film and a measuring roll operated by the film for limiting the movement of the film.

6. The combination in shutter and film roll mechanism for cameras and the like, of a spring for storing power to shift the film, an electromagnet and battery for energizing the same located within the camera casing, contacts operated by the shutter for instantaneously energizing the electromagnet and means controlled by the electromagnet for causing the spring to shift the film for a subsequent exposure.

7. The combination in shutter and film roll mechanism for cameras and the like, of a primary source of power associated therewith, a governor, and means whereby upon the operation of the shutter power is applied to cause the shifting of the film under the control of the governor for a subsequent exposure.

8. The combination in shutter and film roll mechanism for cameras and the like, of a manually wound spring for storing power to shift the film, a primary source of power, a governor and means whereby upon the operation of the shutter power is supplied to cause the spring to shift the film under the control of the governor for a subsequent exposure.

9. The combination in shutter and film roll mechanism for cameras and the like, of a manually wound spring for storing power to shift the film, a primary source of power, a centrifugal governor therefor and means whereby upon the operation of the shutter power is supplied to cause the spring to shift the film under the control of the governor for a subsequent exposure.

10. The combination in shutter and film roll mechanism for cameras and the like, of a manually wound spring for storing power to shift the film, a battery, electromagnetic means whereby upon the closing movement of the shutter power is supplied to cause the spring to shift the film and a measuring roll operated by the film for limiting the movement of the film.

11. The combination in shutter and film roll mechanism for cameras and the like, of a manually wound spring, driving connections between the spring and the film roll, a locking device normally restraining the roll against movement and electromagnetic means for operating the locking device to release the roll upon the operation of the shutter.

12. The combination in shutter and film roll mechanism for cameras and the like, of a manually wound spring, driving connections between the spring and the film roll, a locking device normally restraining the roll against movement, a measuring roll controlling the stopping device, and electromagnetic means for operating the locking device to release the roll upon the operation of the shutter, a battery associated therewith and means whereby the instantaneous closing of the circuit of the battery causes the shifting of the film a predetermined amount.

13. The combination in shutter and film roll mechanism for cameras and the like, a spring geared to the receiving roll, a measuring roll over which the film passes, a member controlled by the measuring roll for locking the gearing against operation, a spring actuated device for operating said member to release the gearing during a predetermined movement of the measuring roll, an electromagnet for controlling the movement of said device and a battery arranged to energize the electromagnet during the closing movement of the shutter.

14. The combination in shutter and film roll mechanism for cameras and the like, of means including a primary battery controlled by the shutter in its return movement for shifting the film for a subsequent exposure.

In witness whereof, I have hereunto set my hand this 28th day of August, 1918.

HENRY F. DOBBIN.